Nov. 14, 1939.  F. W. GODSEY, JR  2,179,623
CONTROL OF PARALLEL OPERATION OF GENERATORS
Filed Feb. 1, 1936
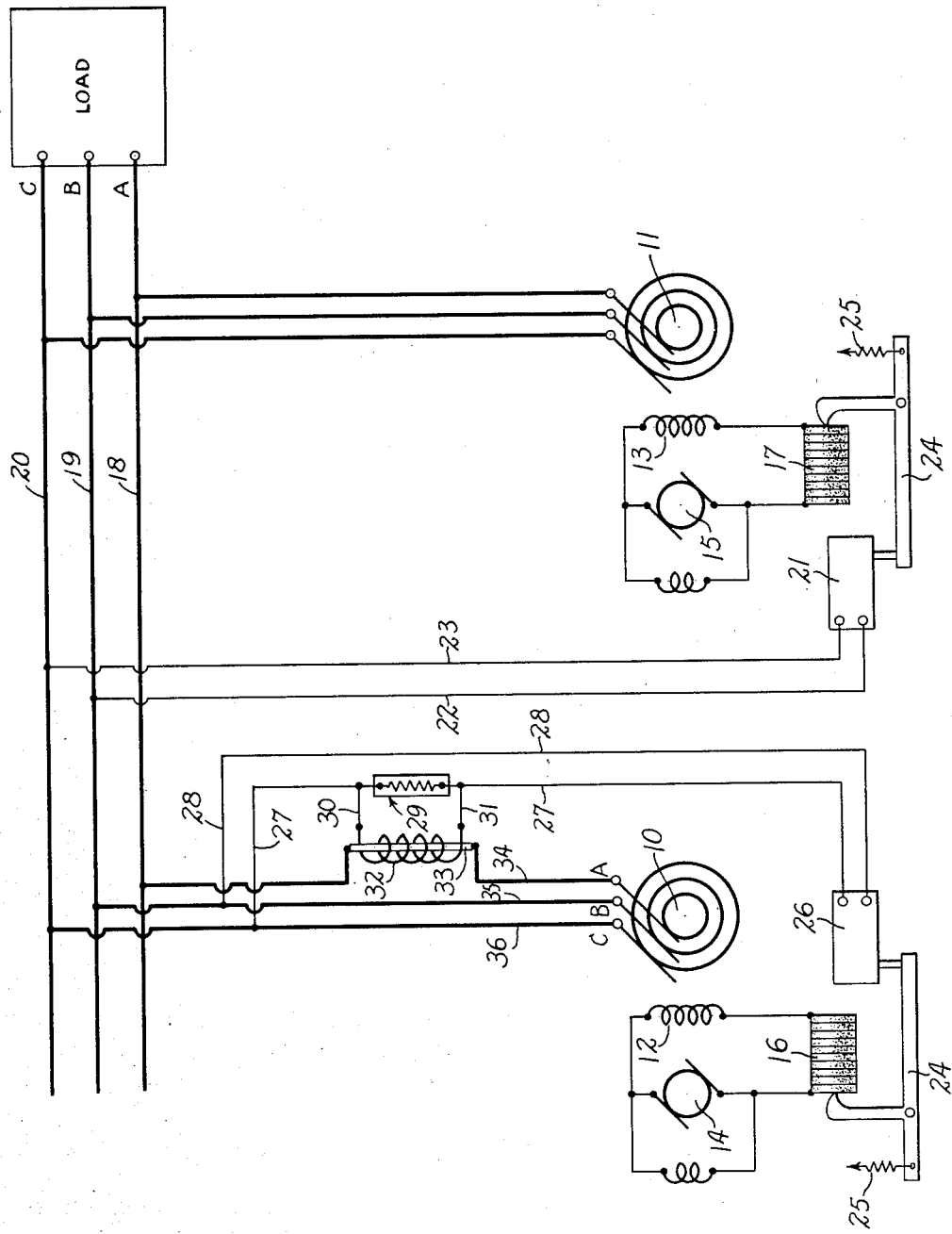
INVENTOR
*Frank W. Godsey, Jr.*
BY
*Blair, Curtis & Dunne*
ATTORNEYS Patented Nov. 14, 1939

2,179,623

UNITED STATES PATENT OFFICE 2,179,623

CONTROL OF PARALLEL OPERATION OF GENERATORS

Frank W. Godsey, Jr., North Adams, Mass., assignor to The Safety Car Heating & Lighting Company, a corporation of New Jersey Application February 1, 1936, Serial No. 61,867

2 Claims. (Cl. 171—119)

This invention relates to the control of alternators operating in parallel and more particularly to a method and apparatus for controlling parallel operation of alternators.

One of the objects of this invention is to provide a practical, simple and inexpensive control arrangement for bringing about proper and satisfactory operation in parallel of alternating current generators. Another object is to provide a practical and dependable system and control of parallel-operating alternators. Another object is to provide a dependable, practical and inexpensive means for achieving satisfactory parallel operation of alternators particularly in cases where the voltage regulation of the alternators is achieved by variable resistances of the carbon pile type. Another object is to provide a system and apparatus of the above-mentioned character in which dependable parallel operation is achieved throughout wide ranges of change of load. Another object is to provide a system and apparatus of the above-mentioned character for achieving dependable parallel operation of alternators at satisfactory or appropriate power factors and throughout changes in load. Another object is to provide a system and apparatus of the above-mentioned character in which the control or regulation of the parallel operation may be dependably achieved with simple, inexpensive and practical and dependable means. Other objects will be in part obvious or in part pointed out hereinafter.

The invention accordingly consists in the features of construction, combination of elements and arrangements of parts as will be exemplified in the structure to be hereinafter described and the scope of the application of which will be indicated in the following claims.

In the accompanying drawing in which is shown an illustrative embodiment of my invention, The figure is a diagrammatic representation of the apparatus and circuit arrangements of a system for controlling or regulating the parallel operation of alternators.

Referring to the figure I have there shown for illustration two alternators 10 and 11 as typifying those that are to be operated in parallel; they are shown as three-phase alternators, though it is to be understood that that is by way of illustration and not by way of limitation, for the alternators may be single-phase, two-phase, or of any suitable or desired number of phases.

Alternator 10 is provided with an exciting field 12 supplied with excitation current from any suitable source, such as a direct current exciter or generator 14 whose output and hence the field excitation of the alternator 10 may be varied in any suitable or desired way, as, for example, by way of the variable resistance shown in the form of a carbon pile 16 which, also by way of illustration, is shown to be in circuit with the alternator field 12 though it may be otherwise positioned as, for example, in circuit with the field winding of the exciter 14.

Alternator 11 and its source of excitation is illustratively similarly arranged and hence it has an exciting field 13 supplied with direct current excitation from the exciter or generator 15, the output of which is variable and controlled by means of a variable resistance in the form of a carbon pile 17.

The output of the alternators 10 and 11 is delivered to bus bars or to the line represented by the conductors 18, 19 and 20 from which a load may be supplied with energy.

The line 18, 19, 20 may, as above indicated, be considered as bus bars or as a power line energized from or by any suitable source or sources of which the alternator 11 may be considered as illustrative, the alternator 11 being provided with any suitable control means for the carbon pile 17, such as a voltage control diagrammatically indicated at 21 and connected by conductors 22 and 23 to a suitable phase of the output of the alternator or of the line. Alternator 10 may therefore be considered as the alternator which it is desired to operate and appropriately regulate in parallel with the power line or bus bars 18, 19, 20 or with the alternator 11.

Alternator 10 has its carbon pile regulator 16 also provided with a suitable and preferably voltage responsive control means which, as in the case of alternator 11, may comprise a suitable lever 24 acting to determine the pressure upon the unanchored end of the carbon pile 16 under the control of, for example, a spring 25 acting in one direction and a suitable voltage responsive winding or windings diagrammatically indicated at 26 and acting in opposition to the spring 25. The voltage responsive control 26 is connected by conductors 27 and 28 across a suitable phase of the alternator 10, such as the phase B—C. But interposed in one of the conductors, such as conductor 27, is a resistance device generally and diagrammatically indicated at 29 and across the resistance 29 is connected as by conductors 30 and 31 the secondary winding 32 of a current transformer whose primary winding 33 is connected in one of the conductors such as conductor 34 of the three conductors 34, 35 and 36 that connect the alternator 10 to the circuit, line, bus bars, or alternator or alternators with which the alternator 10 is to be operated in parallel. Where the voltage responsive winding or control 26 is connected across phase B—C, the primary 33 of the current transformer 32—33 is connected in the line or conductor of phase A. With such a relation of the parts the phase relation between the voltage applied to the regulating or control winding 26 and the voltage appearing in resistance 29 due to the potential drop thereacross caused by the current flowing from the current transformer 33—32, can be so controlled as to regulate the operation of the carbon pile 16 at any desired phase angle between the voltages and the current supplied by the alternator 10, and hence at any desired power factor.

The resistance 29 is made of any suitable material having a non-linear current-voltage characteristic. Illustrative of such a material is the copper oxide disk used in that type of rectifier which has such a conduction characteristic in the conducting direction; a number of these disks may therefore be appropriately connected (as in parallel circuits) so that no final rectification occurs, and substituted for the series resistance 29.

Or, and preferably, a material known commercially as "Thyrite" may be employed; such material is described in U. S. Patent 1,822,742, issued September 8, 1931, to the General Electric Company, and is also described in the "General Electric Review" of February, 1930. It has mechanical characteristics sometimes similar to those of dry-process porcelain and has the characteristic that its conductivity varies with the potential. For example, the ohmic resistance is equal to a constant (which depends upon the physical dimensions of the material to be employed), divided by the current to the exponential $a$, as set forth in the above-mentioned publication. To illustrate the action of this material, it might be noted that its above-mentioned properties are of such a character that doubling the voltage results in a flow of current therethrough, the magnitude of which is on the order of twelve times the magnitude of the current flowing before the voltage was doubled. Where the resistance device 29 takes the form of this Thyrite material, the latter may be in the form of a disk and its constant may be on the order of 14.5; such form of Thyrite material I have found satisfactory in, and mention it as illustrative in connection with, a control system for a low voltage (such as 110 volts) alternator.

To better explain and understand the operation of this system let it first be assumed that the resistance device 29 is an ordinary resistance of substantially linear voltage-current characteristic. With the voltage responsive winding 26 that controls the movement of the lever 24 in conjunction with the spring 25, connected across the phases B and C and with the resistance device 29 made responsive to current flow in the line of phase A, then any in-phase component of current in the A-phase is in quadrature with the voltage across phases B and C and hence the potential drop across resistance 29 is in quadrature with the potential across conductors 35—36. Now let it be assumed that the value of the series resistance 29 is so selected and the current transformer 32—33 has such characteristics that, when the alternator 10 is delivering full load to the line, the voltage drop across the resistance 29 will be in value 20% of the voltage across the phases B and C. There is then effective upon the control coil or winding or electromagnetic means 26 a potential which is the resultant of two components one of which is the potential across phase B—C and the other is a quadrature component 20% in magnitude of that of the voltage across phase B—C due to the potential drop across the resistance 29. The vectorial resultant of these two components is a voltage which is approximately 2% higher than the voltage of phases B—C.

If it is assumed that the regulation of the carbon pile regulator is roughly plus or minus 3% and if it is further supposed that the carbon pile regulator has to be actuated or controlled so as to restore circuit conditions to normal as, for instance, after a sudden load change on the alternator has occurred, a 3% change in effective voltage applied to the voltage control 26 would have to occur to cause the control means 26 to become effective upon the carbon pile 16, it being understood, of course, that the voltage responsive electromagnetic means or winding 26 is set not to the voltage of phase B—C but to a potential that is 2% greater than that phase voltage in order thereby to correspond with the total voltage, as calculated above, that is the vectorial resultant of the two components under full load conditions.

Under these conditions, it will be seen that an out-of-phase current component which will produce a potential drop in the series resistance 29 which will be in phase with the phase voltage B—C is necessary, and the magnitude of this voltage change which must be due to a change in phase angle of the alternator is to be 3% of the total voltage. Now 3% of the total regulator voltage is roughly 15% of the voltage drop appearing across the series resistance 29 due to changes in phase angle of the current in phase A, and a 15% out-of-phase component of current phase A means that the power factor has changed from 100% power factor to approximately 99% power factor. This variation in power factor is of a permissible magnitude and hence, even with a resistance of linear voltage-current characteristic, satisfactory control may under some circumstances be achieved.

However, and particularly where the "regulation" factor of the particular regulator means or mechanism is a substantial one, an ordinary resistance or one having a straight voltage current characteristic might not, in coaction with the other elements, bring about such a small or permissible change in power factor.

For example, assume that the regulation of the regulator is plus 3% and minus 8%, a possible range especially when the regulator is just put into operation and is starting up from a cold condition and has not yet warmed up to its normal operating temperature; in fact, the regulation factor of a regulator may be as much as plus or minus 10%. In the latter case it would be necessary to obtain a quadrature current (in resistance 29) and hence a comparable or like voltage drop that is of a magnitude on the order of 50% (instead of the earlier above-assumed 20%) of the voltage across phases B—C, in order to obtain an appropriate voltage correction in the manner earlier above described. But to obtain that magnitude of quadrature current and hence of a quadrature potential drop, the power factor change would be from 100% to approximately 90% (as compared with the above change from 100% to 99%). This latter change is, as is now apparent, of an undesirable order of magnitude.

Furthermore, these latter considerations, based upon an assumed large "regulation" factor, depend upon the assumption that the alternator is operating at or near full load; but let it be assumed that the alternator is operating under a relatively low load, say on the order of 25% of its normal or rated load. Under these circumstances the component of quadrature current and hence quadrature potential drop, in the resistance 29, that is required, does not change and there would still be required a 50% quadrature current and hence quadrature potential drop. If a change in conditions takes place, requiring a manipulation of the carbon pile 16 and hence a readjustment or resetting of the regulator means, then, since the component of quadrature current to make a voltage correction is the same for low load as it is for full load and since the in-phase component of current would be only 25% (for 25% load) of the former (full load) value, the change in power factor of the alternator would be from 100% to a value approximating 45%, a change that is obviously not only undesirable but also not permissible.

Accordingly, it is seen that by means of the series resistance element 29 that coacts to contribute a corrective factor in coaction with the other elements, satisfactory regulation may be achieved as long as the "regulation" factor of the regulating means is not inappropriately large. Satisfactory regulation may also be achieved if the operation of the alternator in question is unaccompanied by relatively large changes in load, for if the load varies much then the regulated voltage of the alternator is liable to change and if the system in which the alternator is operating is large enough and the voltage on the system is maintained very closely, the alternator may be called upon to supply part of its field excitation, either positive or negative, by means of a phase shift in its current, with a consequent material change in power factor.

To meet or overcome such conditions as have just been noted, the resistance element 29 preferably takes the form of such materials as have earlier above been set forth by way of illustration, materials having a non-linear voltage-current characteristic. Accordingly, let it be assumed that the resistance unit 29 is now comprised of, for example, the above-mentioned Thyrite material and in such cases it will then have impressed across it the potential of the secondary winding 32 of the current transformer 32—33. Now this material, bearing in mind its characteristics as earlier above mentioned, can undergo a current change, roughly, of 1000% with a voltage change thereacross of only 100%, so that doubling the voltage impressed across it by the voltage winding of the current transformer 32—33 (in response to a doubling of the current in conductor 34) would mean a current change through the Thyrite resistance unit 29 (and hence a change in potential drop thereacross) of ten times what it was before the doubling took place.

Accordingly, with a resistance unit of non-linear voltage-current characteristic, the various parts are so proportioned that the corrective potential drop supplied by the resistance unit 29, that being a quadrature component, when the alternator 10 is delivering full load, is such that the regulating means holds the voltage of the alternator 10 at its proper value. But if a change in load or output took place, from that full load to $\frac{1}{10}$ load, then the potential drop appearing across the resistance unit 29, as determined by the current transformer and the corresponding non-linear change in resistance of the device 29, would not be $\frac{1}{10}$ of the full load quadrature potential drop, but would still be of an order of magnitude of over half of the former or full load potential drop so that the change in power factor would not be from 100% to around 25%, 15%, or less, or thereabouts, but would be from 100% to 93% or thereabouts.

Thus, the non-linear voltage-current characteristic of the resistance unit 29 automatically compensates for and against unduly large or otherwise inappropriate changes in magnitude of the quadrature component of the resultant or effective voltage applied to the regulating control means 26, and the coaction of the several parts will thus be seen to be such that satisfactory regulation and maintenance of satisfactory power factors (the latter as against changes in load) can be effectively achieved. And thus, appropriate and in fact extremely close regulation of the parallel operation of the alternator is achievable in a simple, inexpensive and thoroughly dependable manner.

The apparatus and system, moreover, will be seen to be well adapted to the varying conditions of practical use.

As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

1. In apparatus for regulating a polyphase alternator by means of the source of voltage of one phase and the current in one conductor, the combination of, a regulating unit, an electric circuit connecting said regulating unit to the source of voltage of the one phase, said circuit including a resistance unit having the characteristic that the voltage thereacross varies with changes in the current flowing therethrough at a rate less than the change in the rate of current flow, and a current transforming unit with its output side connected across said resistance unit and with its input side carrying the output current of one alternator conductor to produce a voltage across said resistance unit which is in quadrature with the voltage of said source of the one phase, the relative characteristics of said current transforming unit and the other elements associated with said electric circuit being such that the value of the quadrature voltage across said resistance unit is substantially twenty per cent of the voltage of said source of the one phase when a normal load current is flowing, whereby a regulating voltage is impressed upon said regulating unit which is the resultant of two components, one of said components being the potential across the source of the one phase and the other component being a quadrature potential that is a nonlinear function of the current output of the alternator and is of a value to cause out-of-phase currents to become effective in the regulation of the alternator to maintain the out-of-phase currents at a minimum.

2. In apparatus for regulating a polyphase alternator by means of the source of voltage of one phase and the current in one conductor, the combination of, a regulating unit, an electric circuit connecting said regulating unit to the source of voltage of the one phase, said circuit including a resistance unit having the characteristic that the voltage thereacross varies with changes in the current flowing therethrough at a rate less than the change in the rate of current flow, and a current transforming unit with its output side connected across said resistance unit and with its input side carrying the output current of one alternator conductor to produce a voltage across said resistance unit which is in quadrature with the voltage of said source of the one phase, the relative characteristics of said current transforming unit and the other elements associated with said electric circuit being such that the value of the quadrature voltage across said resistance unit is substantially less than the voltage of said source of the one phase when a normal load current is flowing, whereby a regulating voltage is impressed upon said regulating unit which is the resultant of two components, the greater of said components being the potential across the source of the one phase and the lesser of said components being a potential in quadrature therewith, said lesser component varying in phase angle with the phase angle of the current output of the alternator but varying in magnitude with the variations of the current output from normal at a slower rate than the rate of change of the current.

FRANK W. GODSEY, JR.